(12) United States Patent
Yamamoto et al.

(10) Patent No.: US 6,989,404 B2
(45) Date of Patent: Jan. 24, 2006

(54) METHOD OF RECOVERING POLYVINYL CHLORIDE AND APPARATUS THEREFOR

(75) Inventors: Koji Yamamoto, Kobe (JP); Takeharu Tanaka, Kobe (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 292 days.

(21) Appl. No.: 10/312,593

(22) PCT Filed: Mar. 22, 2002

(86) PCT No.: PCT/JP02/02736

§ 371 (c)(1),
(2), (4) Date: Jan. 21, 2003

(87) PCT Pub. No.: WO02/077085

PCT Pub. Date: Oct. 3, 2002

(65) Prior Publication Data

US 2004/0214907 A1    Oct. 28, 2004

(30) Foreign Application Priority Data

Mar. 22, 2001 (JP) ............................. 2001-83291

(51) Int. Cl.
*C08J 11/04* (2006.01)
(52) U.S. Cl. ........................ 521/46.5; 521/46
(58) Field of Classification Search .................. 521/40, 521/45.5, 46.5, 47, 48, 48.5, 49, 49.5
See application file for complete search history.

(56) References Cited

U.S. PATENT DOCUMENTS 3,912,664 A    10/1975 Wainer

| | | | |
|---|---|---|---|
| 6,172,125 B1 * | 1/2001 | Vandenhende et al. | 521/46.5 |
| 2003/0119925 A1 * | 6/2003 | Vandenhende et al. | 521/40 |

FOREIGN PATENT DOCUMENTS

| | | |
|---|---|---|
| CA | 617788 | 4/1961 |
| JP | 5-017616 | 1/1993 |
| JP | 6-279614 | 10/1994 |
| JP | 7-171302 | 7/1995 |
| JP | 7-173324 | 7/1995 |
| JP | 7-179651 | 7/1995 |
| JP | 10-81638 | 3/1998 |
| JP | 11-12390 | 1/1999 |
| JP | 11-181146 | 7/1999 |
| JP | 2000-169625 | 6/2000 |
| JP | 2000-226469 | 8/2000 |
| JP | 2001-000946 | 1/2001 |
| JP | 2001-342288 | 12/2001 |
| WO | 01/23463 | 4/2001 |
| WO | 01/70865 | 9/2001 |

* cited by examiner

*Primary Examiner*—Katarzyna Wyrozebski
(74) *Attorney, Agent, or Firm*—Oblon, Spivak, McClelland, Maier & Neustadt, P.C.

(57) ABSTRACT

Disclosed is a polyvinyl chloride recovering method for recovering polyvinyl chloride from waste including polyvinyl chloride by a continuous operation, and an system for carrying out the method, wherein the method comprises: an insoluble solid matter removing process of removing insoluble solid matters from a hot mixture of a solvent capable of dissolving polyvinyl chloride, and the waste; a solidifying process of solidifying polyvinyl chloride in water by bringing hot water into contact with a solution obtained by removing the insoluble solid matters from the hot mixture to remove the solvent; and a separating process of separating the solidified polyvinyl chloride from the water.

11 Claims, 4 Drawing Sheets

METHOD OF RECOVERING POLYVINYL CHLORIDE AND APPARATUS THEREFOR

TECHNICAL FIELD

The present invention relates to a method of recovering polyvinyl chloride from waste including polyvinyl chloride.

BACKGROUND ART

Various polymers are produced and used in our environment. Polyvinyl chloride, in particular, is applied to various uses similarly to other general-purpose polymers including polyesters and polyolefins, such as polyethylenes and polypropylenes, because polyvinyl chloride is excellent in workability and inexpensive. However, those general-purpose polymers are mass-produced for application not only to the field of basic articles having a long product life cycle but also to the field of commercial articles, such as dairy necessities having a short life of use. Consequently, a large amount of those articles are scrapped, causing environmental pollution. Composite articles formed of resins containing polyvinyl chloride and other polymers are encountered by greater problems.

Various techniques for polymer waste recycling have been studied. There has been growing expectation of using polymer waste as heat source for blast furnaces because of its low cost of waste disposal. However, when polymer waste including those combined or mixed with polyvinyl chloride is incinerated to use the same as a heat source, free chloride liberated from polymer waste damages furnace body refractories. When polyvinyl chloride is burnt, organic chlorine compounds including dioxin and the like highly toxic to human bodies are generated.

Various techniques have been proposed to solve those problems. One of those previously proposed techniques, for example, mixes a solvent capable of dissolving polyvinyl chloride in a mixture of various polymers, filters out insoluble solid matters, and injects steam into the solvent to solidify and precipitate polyvinyl chloride dissolved in the solvent. However, this method makes the solvent evaporate so that polyvinyl chloride is solidified after the polyvinyl chloride concentration has exceeded the solubility of polyvinyl chloride in the solvent. Thus the method is unsuitable for a continuous operation that evaporates a large amount of solvent continuously, and there is room for improvement.

The present invention has been made in view of the foregoing circumstances and it is therefore an object of the present invention to provide a method of recovering polyvinyl chloride from waste including polyvinyl chloride by a continuous operation, and an system for carrying out the method.

DISCLOSURE OF THE INVENTION

A polyvinyl chloride recovering method according to the present invention capable of achieving the foregoing object for recovering polyvinyl chloride from waste including polyvinyl chloride comprises: an insoluble solid matter removing process of removing insoluble solid matters from a hot mixture of a solvent capable of dissolving polyvinyl chloride, and the waste; a solidifying process of solidifying polyvinyl chloride in water by bringing hot water into contact with a solution obtained by removing the insoluble solid matters from the hot mixture to remove the solvent; and a separating process of separating the solidified polyvinyl chloride from the water. Preferably, the solvent is a polar solvent.

It is recommended that the foregoing solidifying means injects the solution into hot water to bring the solution into contact with the hot water.

When the polyvinyl chloride recovering method includes a circulation process of feeding at least part of the mixture of the solidified polyvinyl chloride and water to a circulation slurry crasher and returning the crashed and pulverized polyvinyl chloride to the solidifying process, large, bulky polyvinyl chloride articles can be crashed and pulverized, which provides a further improved effect.

Preferably, the temperature of the hot water is in the range of a temperature equal to the boiling point of the solvent to a temperature equal to the boiling point of the solvent plus 10° C.

A polyvinyl chloride recovering system according to the present invention capable of achieving the foregoing object for recovering polyvinyl chloride from waste including polyvinyl chloride comprises: an insoluble solid matter removing means for removing insoluble solid matters from a hot mixture of a solvent capable of dissolving polyvinyl chloride, and the waste; polyvinyl chloride solidifying means for solidifying polyvinyl chloride in water by bringing a solution obtained by removing the insoluble solid matters from the hot mixture into contact with hot water to remove the solvent; and a separating means for separating the solidified polyvinyl chloride from the water.

Preferably, the solidifying means brings the solution into contact with the hot water by injecting the solution into the hot water.

It is recommended that the polyvinyl chloride recovering system further comprises a returning means for feeding at least part of the mixture of the solidified polyvinyl chloride and water to a circulation slurry crasher and returning the crashed and pulverized polyvinyl chloride to the polyvinyl chloride solidifying means.

BEST MODE FOR CARRYING OUT THE INVENTION

Figure 1:
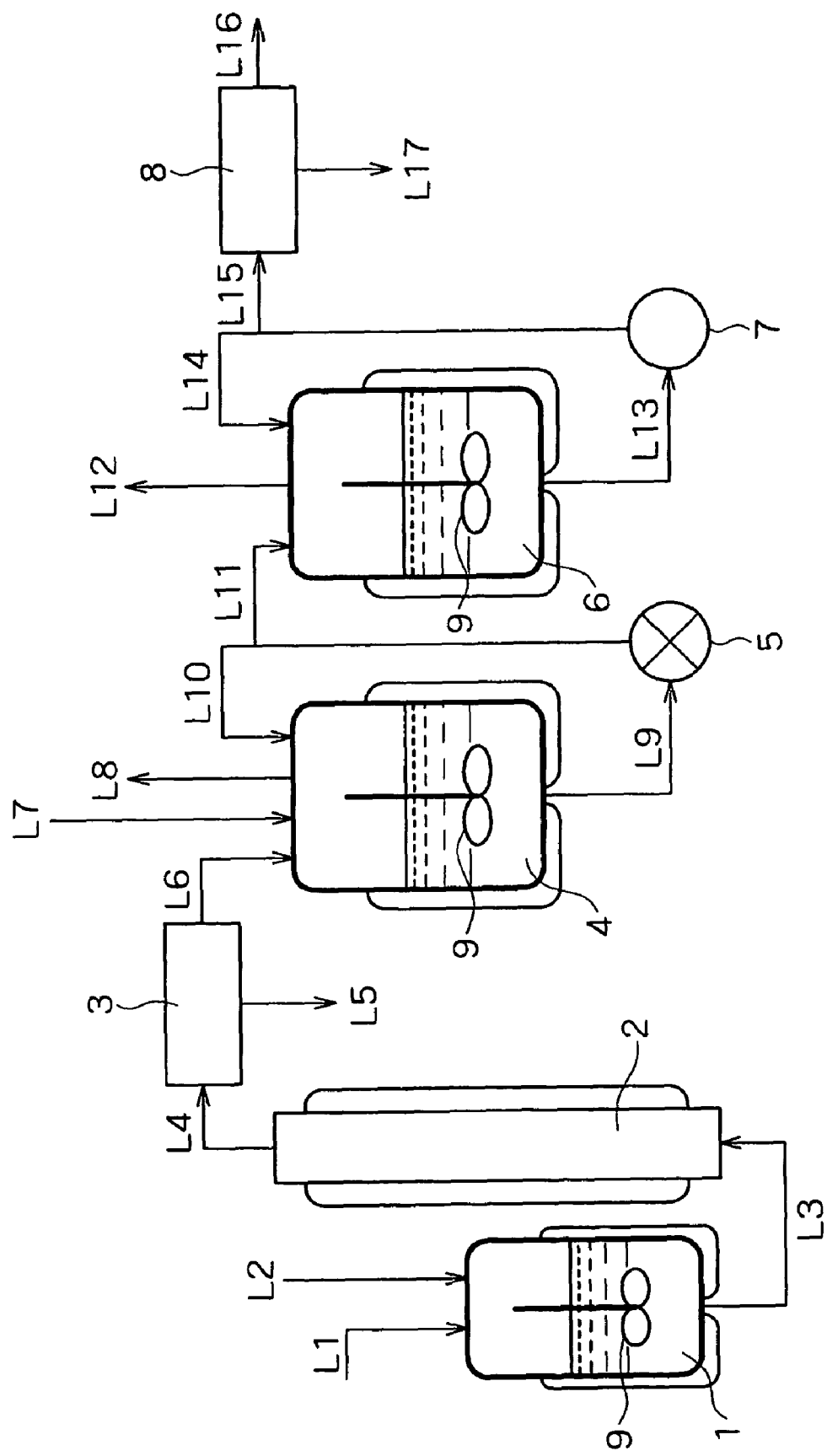
FIG. 1 is a diagrammatic view of a polyvinyl chloride recovering system in a first embodiment according to the present invention.

The inventors of the present invention made earnest studies of a method and an system for efficiently recovering polyvinyl chloride from a solvent in which polyvinyl chloride is dissolved, and found that polyvinyl chloride can be continuously recovered from a solvent in which polyvinyl chloride is dissolved by bringing the solvent into contact with hot water to remove the solvent regardless of the amount of the solvent. The function and effect of the present invention will be described hereinafter.

A polyvinyl chloride recovering method according to the present invention is characterized by the following processes (1) to (3)

(1) Insoluble matter removing process of removing insoluble solid matters from a hot mixture of waste and a solvent capable of dissolving polyvinyl chloride (2) Solidifying process of solidifying polyvinyl chloride in water by bringing hot water into contact with a solution obtained by removing the insoluble solid matters from the hot mixture to remove the solvent (3) Separating process of separating the solidified polyvinyl chloride from the water In principle, the processes (1) to (3) are carried out in that order. When necessary, other processes may be added to those processes, and changes in design including combination of the processes and separation of processes may be made within the scope of the present invention.

The processes (1) to (3) will be described in detail.

(1) Insoluble matter removing process of removing insoluble solid matters from a hot mixture of waste and a solvent capable of dissolving polyvinyl chloride The present invention mixes waste including polyvinyl chloride and a solvent capable of dissolving polyvinyl chloride. This enables the following processes to recover polyvinyl chloride selectively from the waste.

The present invention needs to use a hot mixture of the waste and the solvent capable of dissolving polyvinyl chloride. The hot mixture is prepared by heating a mixture of waste including polyvinyl chloride, and a solvent capable of dissolving polyvinyl chloride. This improves the solubility of polyvinyl chloride in the solvent and hence polyvinyl chloride can be efficiently dissolved in a small quantity of the solvent and, therefore, a large quantity of waste can be processed.

The present invention needs to separate insoluble solid matters insoluble in the solvent from the solution and to remove the insoluble solid matters. The solution containing the dissolved polyvinyl chloride is processed by the following process to recover polyvinyl chloride. The solid matters that could not be dissolved in the solvent are polymers not containing polyvinyl chloride and hence do not contain materials that produces organic chlorine compounds. Therefore, those solid matters can be used as fuel, for example for blast furnaces.

The solvent employed in the present invention is used to dissolve polyvinyl chloride included in the waste; that is, the solvent is a poor solvent incapable of or having difficulty in dissolving other components of the mixture, such as polyethylene and polypropylene. Therefore, the solvent is properly selectively determined taking into consideration the types and contents of the components of the waste. Preferably, the solvent is a polar solvent, such as dioxane, butyl acetate or dichloroethane. A ketone solvent is particularly preferable. Polyvinyl chloride included in the waste containing polymers including polyolefins can be selectively dissolved by using the foregoing solvent. A ketone solvent is capable of dissolving polyvinyl chloride having a large molecular weight. Acetone, methyl ethyl ketone and diethyl ketone are ketone solvents. The solvent may be a mixture of some of the foregoing solvents.

Heating temperature at which the solvent is heated is dependent on the type of the solvent; the heating temperature may be any temperature below a temperature at which the solvent volatilizes. The heating temperature may be controlled so that operations can be safely carried out. The present invention heats the mixture of the waste and the solvent, the waste may be mixed in the heated solvent to dissolve polyvinyl chloride.

The heated mixture may be divided into the insoluble solid matters and the solution by any suitable separating means, such as a centrifugal separating method or a decantation method.

(2) Solidifying process of solidifying polyvinyl chloride in water by bringing hot water into contact with a solution obtained by removing the insoluble solid matters from the hot mixture to remove the solvent The present invention brings the solvent obtained by separating the insoluble solid matters from the mixture into contact with hot water to reduce the solubility of polyvinyl chloride in the solvent greatly and to volatilize the solvent contained in the solution. Consequently, polyvinyl chloride contained in the solution can be gradually solidified. The solidification rate of polyvinyl chloride can be adjusted by controlling the temperature of the hot water to avoid the massive coagulation of polyvinyl chloride due to the instantaneous volatilization of the solvent caused by heat applied to the solution by steam.

Preferably, the temperature of the hot water is in the range of a temperature about equal to the boiling point of the solvent to a temperature about equal to the boiling point of the solvent plus 10° C. If the temperature of the hot water is far higher than the boiling point of the solvent, the solvent volatilizes rapidly upon the contact with the hot water, and polyvinyl chloride is solidified unsatisfactorily in large, masses. When the temperature of the hot water is below the temperature about equal to the boiling point of the solvent plus 10° C., the solidification of polyvinyl chloride in masses can be prevented. The polyvinyl chloride thus solidified is precipitated in a slurry in the hot water. The slurry of polyvinyl chloride can be continuously sent to the next process.

According to the present invention, there is no any restriction on a method of bringing the solution into contact with the hot water. a method that injects the solution into the hot water is recommended. When the solution is brought into contact with the hot water by this recommended method, only the solidification of polyvinyl chloride is interrupted temporarily when the solution is not injected into the hot water at a fixed rate or the operation is stopped suddenly, and the rate of injection of the solution into the hot water does not need to be controlled precisely.

It is recommended to provide a reaction vessel with a stirring means to promote the solidification of polyvinyl chloride from the solution.

Preferably, the present invention includes a crashing process that feeds at least part of the slurry to a circulation slurry crasher and returns the crashed and pulverized polyvinyl chloride to the solidifying process. The crashing process mixes fine solidified polyvinyl chloride masses in the solution containing polyvinylchloride. The fine solidified polyvinyl chloride masses serve as seed particle for the solidification of polyvinyl chloride, which promotes solidification of a large amount of polyvinyl chloride in fine masses and reduces time necessary for solidification. Since polyvinyl chloride is solidified around the seed particle through out the system, formation of large masses by the coagulation of solidified solid polyvinyl chloride can be prevented and formation of massive solids can be suppressed.

The present invention recommends repeating the solidifying process at least twice. If the solidifying process is carried out once, some part of the solvent remains in the slurry containing polyvinyl chloride solids. Consequently, the solvent cannot be fully recycled or the recovered polyvinyl chloride is sticky. Therefore, it is recommended that the slurry produced by the solidifying process is brought into contact with another hot water in a vessel by another solidifying process to recover the residual solvent.

Desirably, the temperature of the hot water for the second solidifying process is slightly higher than that of the hot water for the first solidifying process. Thus the residual solvent remaining in the slurry can be completely removed from the slurry. Although there is no particular restriction on the temperature, it is preferable that the temperature is higher by about 10° C. than that of the hot water for the first solidifying process.

The solvent volatilized by the heat of the hot water contains some moisture. When necessary, the solvent is dehydrated by a dehydrating process, and the dehydrated solvent can be used again for dissolving polyvinyl chloride.

(3) Separating process of separating the solidified polyvinyl chloride from the water Lastly, the present invention separates the solidified polyvinyl chloride from the slurry to recover solid polyvinyl chloride. Any known separating method may be used. For example, a centrifugal separating method or a decantation method may be used. When necessary, the separated water is heated and the heated water can be returned to the solidifying process.

A polyvinyl chloride recovering system to achieve the object of the present invention will be described hereinafter. The polyvinyl chloride recovering system of the present invention is characterized by the following means (1) to (3).

(1) Insoluble matter removing means for removing insoluble solid matters from a hot mixture of waste and a solvent capable of dissolving polyvinyl chloride (2) Solidifying means for solidifying polyvinyl chloride in water by bringing hot water into contact with a solution obtained by removing the insoluble solid matters from the hot mixture to remove the solvent (3) Separating means for separating the solidified polyvinyl chloride from the water In principle, the means (1) to (3) are operated in that order. When necessary, other processing means may be added to those processing means, and changes in design including combination of the means and separation of the means may be made within the scope of the present invention.

There is no particular restriction on the insoluble matter removing means and the separating means; the insoluble matter removing means and the separating means may be centrifugal separating means or a simple static precipitator.

There is no particular restriction on the solidifying means of the present invention, provided that the solidifying means is capable of bringing a solvent containing dissolved polyvinyl chloride into contact with hot water. The solidifying means may be, for example, a means that injects the solvent into hot water contained in a vessel or a means that sprays (injects) the solution in a shower.

The polyvinyl chloride recovering system of the present invention needs a mixing means for mixing waste and a solvent capable of dissolving polyvinyl chloride and a heating means for heating a mixture prepared by mixing the waste and the solvent. The mixing means and the heating means must be installed on the upstream side of the removing means. A heating-and-mixing means formed by combining the mixing means and the heating means may be used.

There is no particular restriction on the mixing means of the present invention; the mixing means may be a known one. Preferably, the mixing means is provided with a stirrer.

Preferably, the heating-and-mixing means of the present invention is a static mixer provided with a heating mechanism, a high shearing dynamic mixer provided with a heating mechanism or a tower mixing vessel having the L/D ratio of three or above. A static mixer provided with a heating mechanism is satisfactory in heat transfer efficiency and stirring efficiency, and is capable of completing a process in a short retention time. Although the static mixer may be of any type, a static mixer commercially available from Noritake Co., Ltd. or a static mixer commercially available from Sulzer may be used. A high shearing dynamic mixer provided with a heating means is capable of forcibly shearing, heating, stirring and mixing materials, and hence the high shearing dynamic mixer is capable of completing a process in a shorter retention time. Although the dynamic mixer may be of any type, a pipeline mixer commercially available from Tokusyu Kika Kogyo may be used. When the tower stirring vessel having the L/D ratio of three or above is used, plug flow occurs and solid polyvinyl chloride not dissolved in the solvent is not supplied to the following processes.

Preferably, the system of the present invention is additionally provided with a circulation slurry crasher, at least part of the mixture of the solidified polyvinyl chloride and water is supplied to the circulation slurry crasher, and the crashed and pulverized polyvinyl chloride is returned to the solidifying means by a returning means to use an effect of solidifying fine masses. A circulation slurry crasher commercially available from Tokusyu Kika Kogyo Co., Ltd. or Komatus Zenoah Corp. is an example of the circulation slurry crasher.

Embodiments

Preferred embodiment of the present invention will be described, which is not intended to limit the present invention and changes in design in the light of teachings mentioned above and to be mentioned later are included in the scope of the present invention.

Representative processes of a method according to the present invention will be described with reference to FIG. 1.

Referring to FIG. 1, indicated at 1 is a mixing vessel, and at 9 is a stirrer. Waste including polyvinyl chloride is supplied through a line L1 and a solvent capable of dissolving polyvinyl chloride is supplied through a line L2 into and mixed in the mixing vessel 1. A mixture thus obtained is supplied through a line L3 to a static mixer 2 provided with a heating means. The static mixer 2 dissolves the polyvinyl chloride completely in the solvent. The heated mixture is supplied through a line L4 to a centrifugal separator 3. The centrifugal separator 3 divides the mixture into insoluble solid matters insoluble in the solvent, and a solution. The insoluble solid matters are discharged through a line L5.

The solution separated from the insoluble solid matters is supplied through a line L6 into a granulating vessel 4. The solution is mixed with hot water supplied through a line L7 into the granulating vessel 4. As the solvent is volatilized by the heat of the hot water, the solubility of the polyvinyl chloride in the solvent decreases. Consequently, the polyvinyl chloride is solidified in a slurry. The volatilized solvent is discharged through a line L8 from the system. When desired, the solvent is returned to the mixing vessel 1 to use the same again.

The hot water does not need to be supplied continuously through the line L7 into the granulating vessel 4. The place of supply of the hot water and the feed rate of the hot water may be properly controlled according to the rate of supply of the solution from the centrifugal separator 3 into the granulating vessel 4.

The slurry containing polyvinyl chloride is sent through a line L9 to a slurry crasher 5. At least part of the crashed and pulverized slurry is returned through a line L10 to the granulating vessel 4 and is used as seed particle for polyvinyl chloride solidification. The slurry is supplied through a line L11 to a solvent removing vessel 6. The temperature of water contained in the solvent removing vessel 6 is higher than that in the granulating vessel 4. The residual solvent remaining in the slurry is volatilized and removed, and the volatilized solvent is discharged through a line L12 from the system.

After the residual solvent has been removed, the slurry is pumped out of the solvent removing vessel 6 through a line L13 by a pump 7. At least part of the slurry is returned through a line L14 to the solvent removing vessel 6 and the rest of the slurry is sent through a line L15 to a centrifugal separator 8. The centrifugal separator 8 divides the slurry into water and polyvinyl chloride. The polyvinyl chloride is recovered through a line L17. The water is discharged through a line L16 and, when necessary, the water is heated and is used again by the granulating vessel 4.

Figure 2:
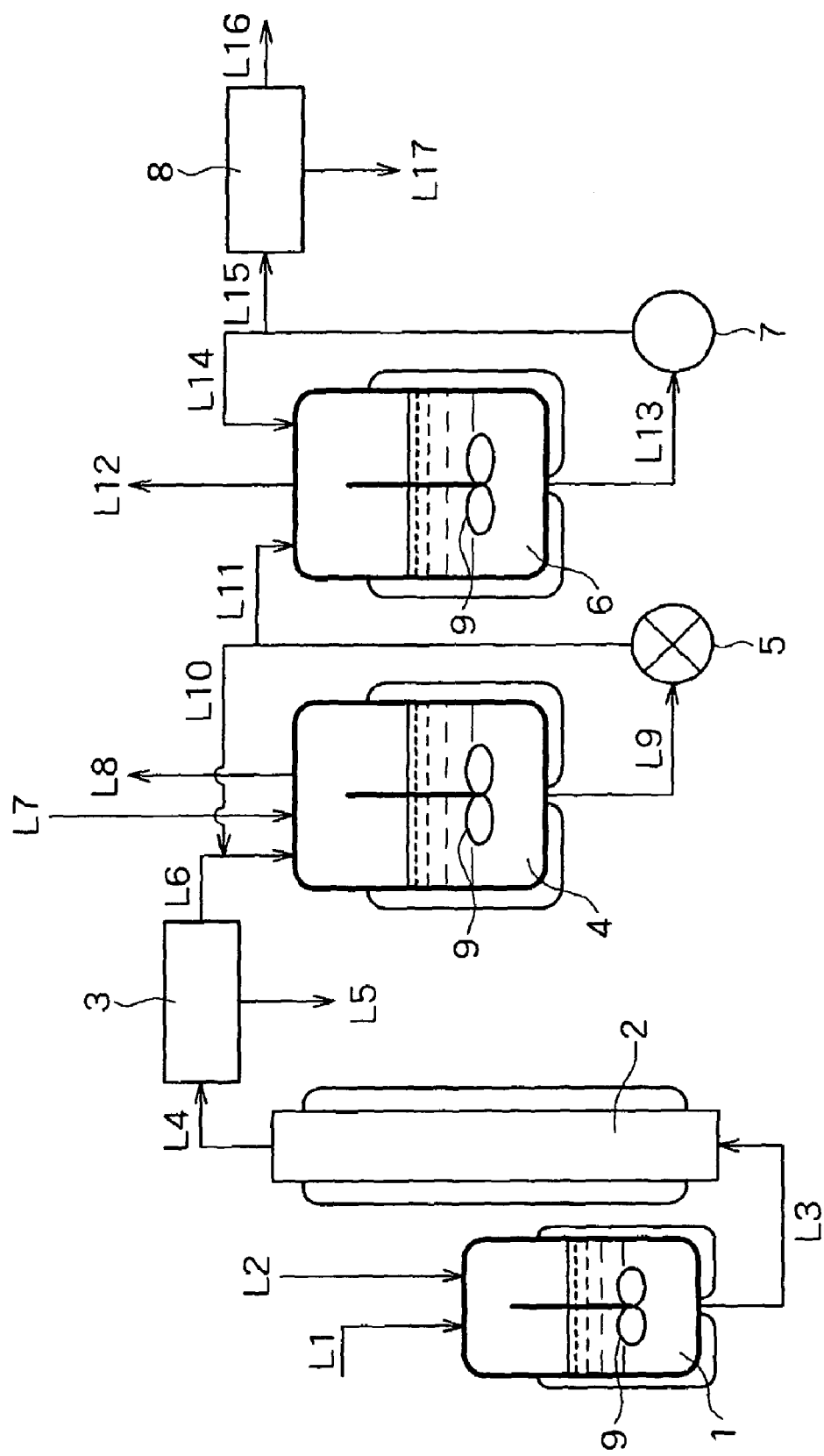
FIG. 2 is a diagrammatic view of a polyvinyl chloride recovering system in a second embodiment according to the present invention.
Figure 3:
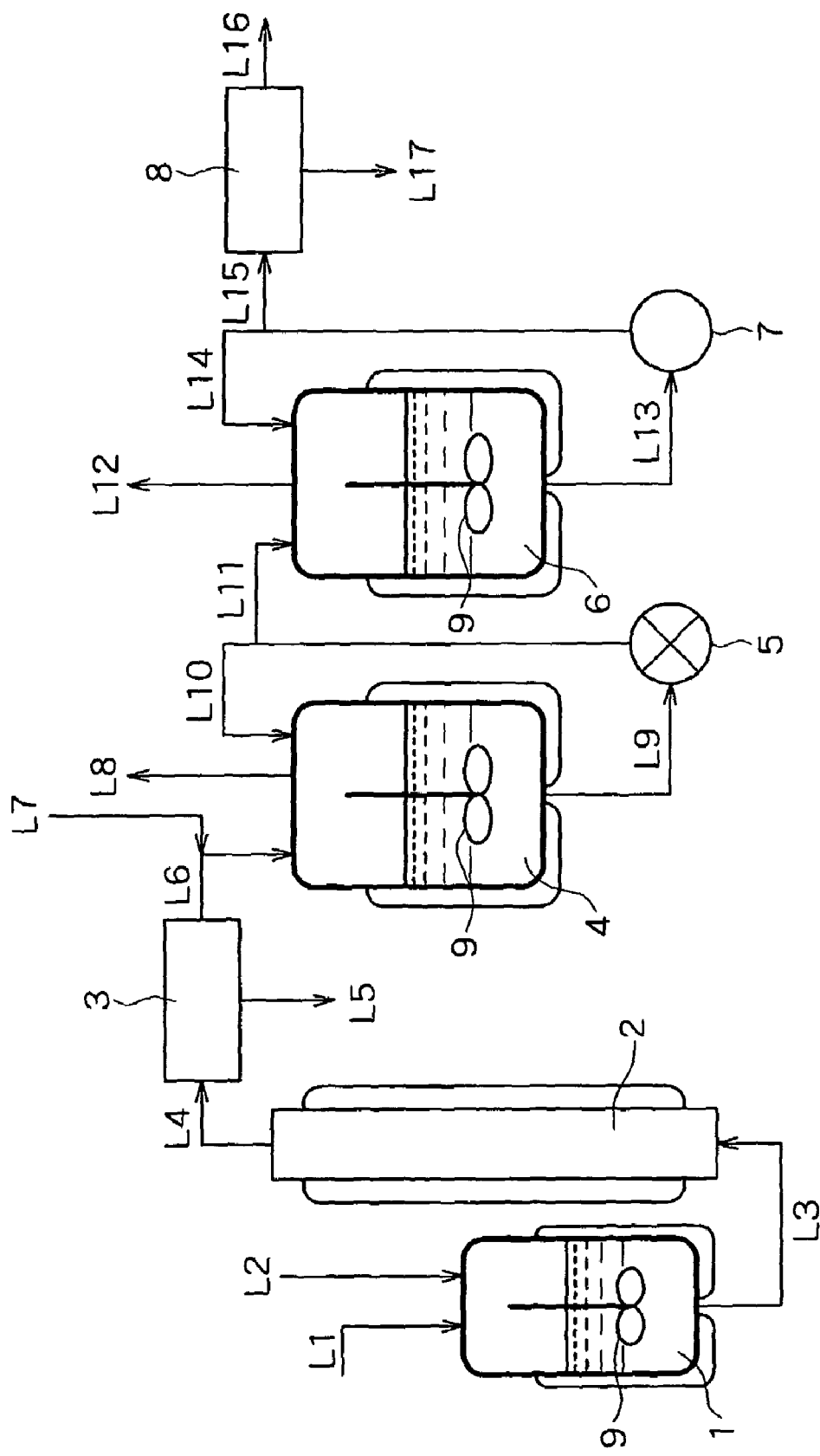
FIG. 3 is a diagrammatic view of a polyvinyl chloride recovering system in a third embodiment according to the present invention.
Figure 4:
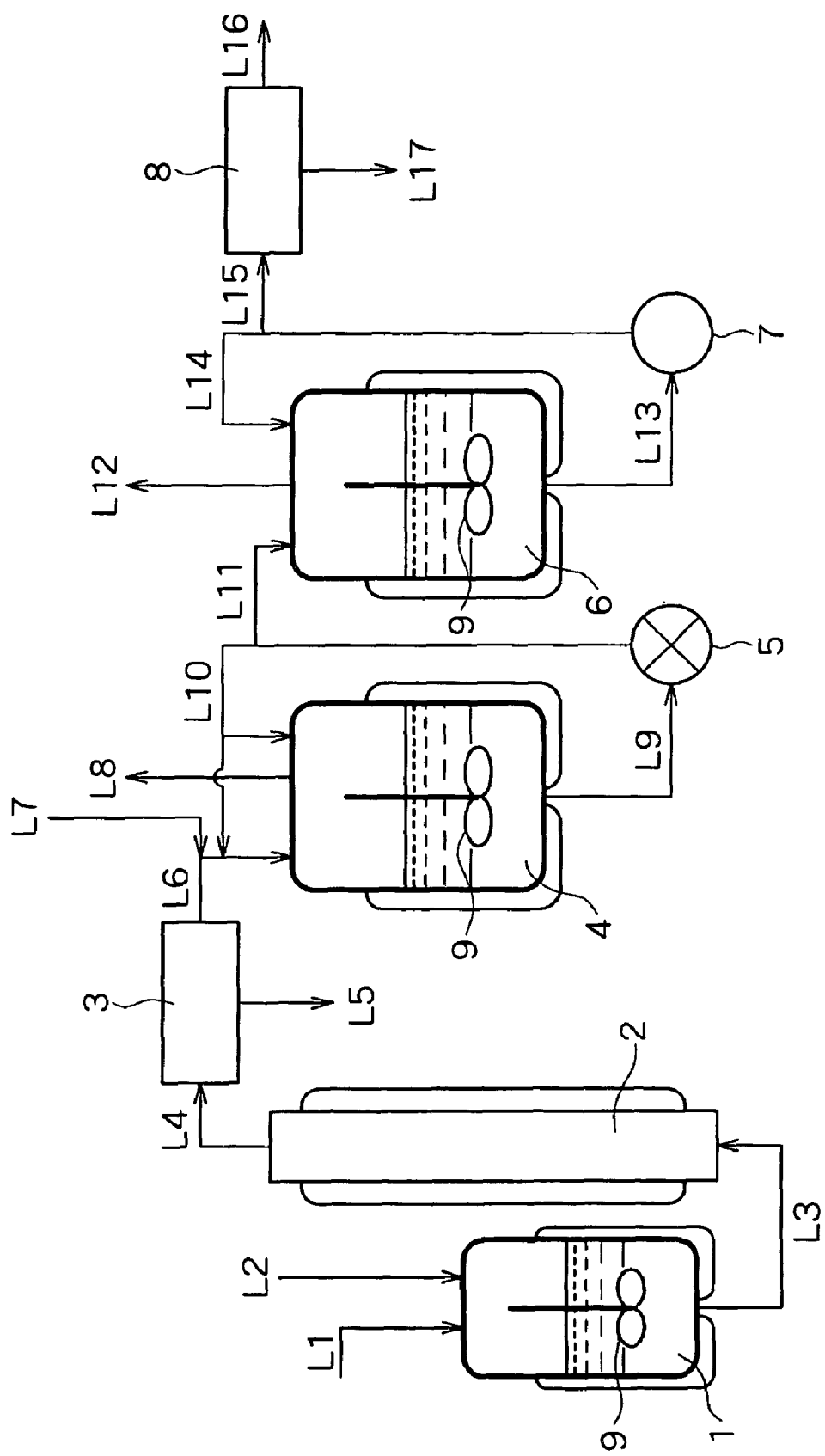
FIG. 4 is a diagrammatic view of a polyvinyl chloride recovering system in a fourth embodiment according to the present invention.

FIGS. 2 to 4 show polyvinyl chloride recovering systems in other embodiments according to the present invention, in which parts like or corresponding to those shown in FIG. 1 are denoted by the same reference characters and the description thereof will be omitted to avoid duplication.

FIG. 2 shows the polyvinyl chloride recovering system that mixes at least part of a slurry crashed and pulverized by a slurry crasher 5, and a solution obtained by removing insoluble solid matter by a centrifugal separator 3, and supplies a mixed solution thus obtained to a granulating vessel 4.

FIG. 3 shows the polyvinyl chloride recovering system that mixes hot water, and a solution obtained by removing insoluble solid matters by a centrifugal separator 3, supplies a mixed solution thus obtained to a granulating vessel 4.

FIG. 4 shows the polyvinyl chloride recovering system that mixes at least part of a slurry crashed and pulverized by a slurry crasher 5, a solution obtained by removing insoluble solid matters by a centrifugal separator 3, and hot water to obtain a mixed solution, and supplies the mixed solution to a granulating vessel 4.

Polyvinyl chloride can be selectively recovered from waste including polyvinyl chloride by the foregoing operations.

INDUSTRIAL APPLICABILITY

The foregoing methods and systems are capable of efficiently recovering polyvinyl chloride from waste including polyvinyl chloride. Consequently, waste not including polyvinyl chloride can be effectively used as resources. The recovered polyvinyl chloride having high purity can be recycled.

What is claimed is:

1. A polyvinyl chloride recovering method for recovering polyvinyl chloride from waste including polyvinyl chloride, said method comprising:
   an insoluble solid matter removing process of removing insoluble solid matters from a hot mixture of a solvent capable of dissolving polyvinyl chloride, and the waste;
   a solidifying process of solidifying polyvinyl chloride in water by bringing hot water into contact with a solution obtained by removing the insoluble solid matters from the hot mixture to remove the solvent; and
   a separating process of separating the solidified polyvinyl chloride from the water, wherein at least part of a mixture of the solidified polyvinyl chloride and water obtained by the solidifying process is supplied to a circulation slurry crasher and the crashed and pulverized polyvinyl chloride is returned to the solidifying process.

2. The polyvinyl chloride recovering method according to claim 1, wherein the solvent is a polar solvent.

3. The polyvinyl chloride recovering method according to claim 1, wherein the solution is injected into hot water to bring the solution into contact with the hot water.

4. The polyvinyl chloride recovering method according to claim 1, wherein the solvent is a polar solvent, and the solution is injected into hot water to bring the solution into contact with the hot water.

5. The polyvinyl chloride recovering method according to claim 1, wherein the solvent is a polar solvent, and the temperature of the hot water is in the range of a temperature equal to the boiling point of the solvent to a temperature equal to the boiling point of the solvent plus 10° C.

6. The polyvinyl chloride recovering method according to claim 1, wherein the temperature of the hot water is in the range of a temperature equal to the boiling point of the solvent to a temperature equal to the boiling point of the solvent plus 10° C., and the solution is injected into hot water to bring the solution into contact with the hot water.

7. The polyvinyl chloride recovering method according to claim 1, wherein the temperature of the hot water is in the range of a temperature equal to the boiling point of the solvent to a temperature equal to the boiling point of the solvent plus 10° C.

8. A polyvinyl chloride recovering method for recovering polyvinyl chloride from waste including polyvinyl chloride, said method comprising:
   an insoluble solid matter removing process of removing insoluble solid matters from a hot mixture of a solvent capable of dissolving polyvinyl chloride, and the waste;
   a solidifying process of solidifying polyvinyl chloride in water by bringing hot water into contact with a solution obtained by removing the insoluble solid matters from the hot mixture to remove the solvent; and
   a separating process of separating the solidified polyvinyl chloride from the water, wherein the temperature of the hot water is in the range of a temperature equal to the boiling point of the solvent to a temperature equal to the boiling point of the solvent plus 10° C.

9. The polyvinyl chloride recovering method according to claim 8, wherein the solvent is a polar solvent, the solution is injected into hot water to bring the solution into contact with the hot water, at least part of a mixture of the solidified polyvinyl chloride and water obtained by the solidifying process is supplied to a circulation slurry crasher, and the crashed and pulverized polyvinyl chloride is returned to the solidifying process.

10. A polyvinyl chloride recovering system for recovering polyvinyl chloride from waste including polyvinyl chloride, said system comprising:
   an insoluble solid matter removing means for removing insoluble solid matters from a hot mixture of a solvent capable of dissolving polyvinyl chloride, and the waste;
   polyvinyl chloride solidifying means for solidifying polyvinyl chloride in water by bringing a solution obtained by removing the insoluble solid matters from the hot mixture into contact with hot water to remove the solvent;
   a separating means for separating the solidified polyvinyl chloride from the water; and
   a returning means for feeding at least part of the mixture of the solidified polyvinyl chloride and water to a circulation slurry crasher and returning the crashed and pulverized polyvinyl chloride to the polyvinyl chloride solidifying means.

11. The polyvinyl chloride recovering system according to claim 10, wherein the solidifying means brings the solution into contact with the hot water by injecting the solution into the hot water.

* * * * *